UNITED STATES PATENT OFFICE.

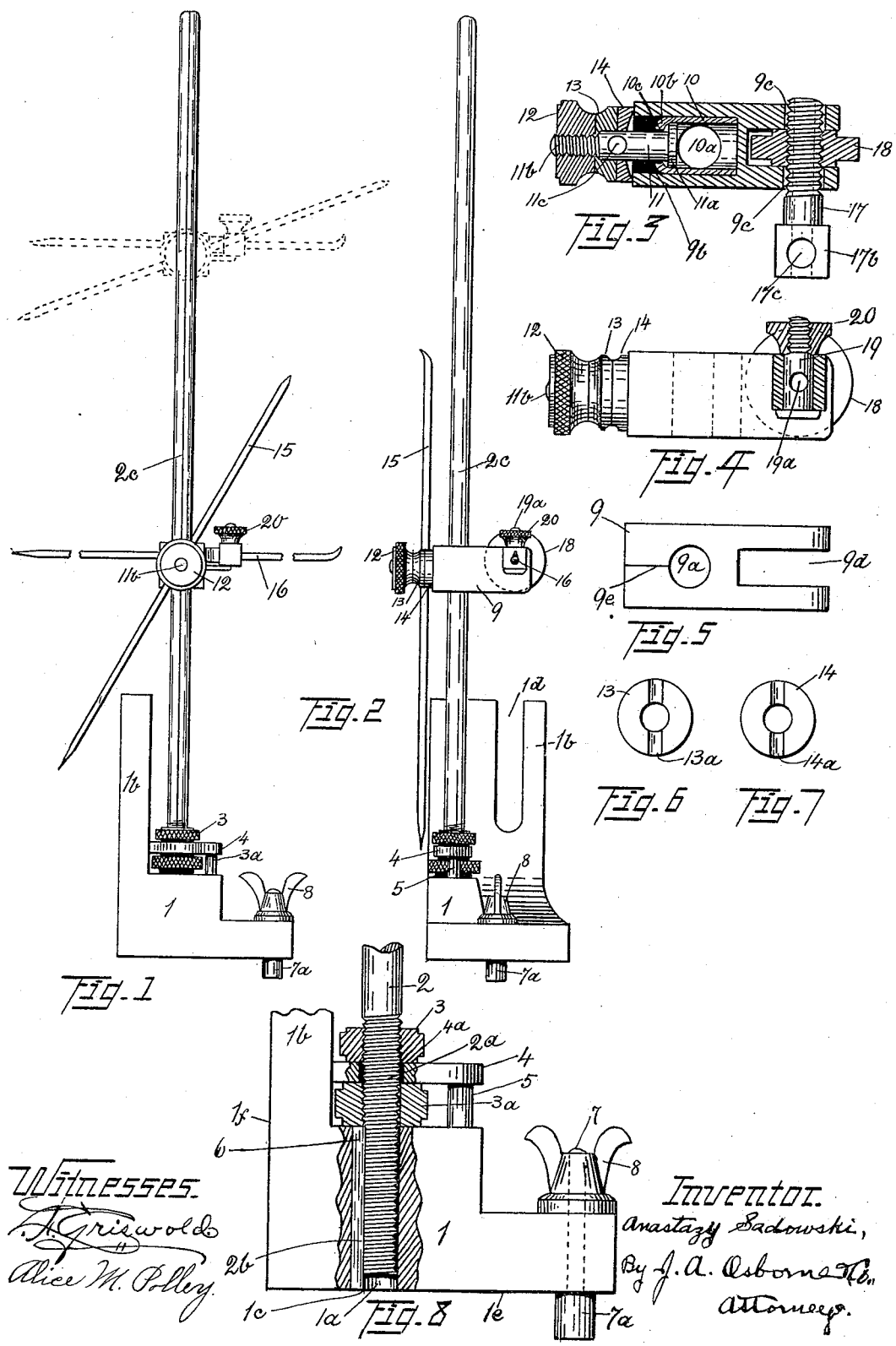

ANASTAZY SADOWSKI, OF CLEVELAND, OHIO.

SURFACE-GAGE.

SPECIFICATION forming part of Letters Patent No. 641,332, dated January 16, 1900.

Application filed December 27, 1897. Renewed September 14, 1899. Serial No. 730,511. (No model.)

*To all whom it may concern:*

Be it known that I, ANASTAZY SADOWSKI, a citizen of the United States, residing at Cleveland, in the county of Cuyahoga, State of Ohio, have invented certain new and useful Improvements in Surface-Gages, of which the following, with the accompanying drawings, is a full, clear, and an exact specification.

My invention relates to devices known as surface-gages that may be attached to or used with lathes, planers, shapers, drill-presses, and other machine-tools to locate, adjust, line up, and to lay out work to be done by such tools.

The object of my invention is an improved surface-gage by which the work may be laid out and gaged with great accuracy, convenience, and effectiveness, that may be quickly, easily, and accurately adjusted to gage and lay out all kinds of work to be done by machine-tools, and the adjustments fixed to prevent errors in laying out the work.

My invention consists in the construction and combination of the several parts described herein and substantially as defined in the claims.

In the drawings, Figure 1 is a side elevation of a surface-gage embodying my improvements. Fig. 2 is a front elevation thereof. Fig. 3 is a central horizontal section through the scribing-block and its attachments carried by and movable vertically upon the vertical spindle, seen in Figs. 1, 2, and 8. Fig. 4 is a side view of said scribing-block and its attachments, one of the attachments being shown in vertical section. Fig. 5 is a top view of said scribing-block without its attachments. Figs. 6 and 7 are views of the meeting faces of the washers that clamp the radially-adjustable scriber; and Fig. 8 is a side elevation of the base of the device, partly in section, to illustrate the means employed for adjustably connecting the vertical spindle with the base. Figs. 3 to 8, inclusive, are enlarged from Figs. 1 and 2, being approximately full size.

The base 1 has a vertical bore $1^a$ therein, in which is supported a vertically-adjustable spindle 2. The vertical spindle is threaded at its lower end $2^a$ to receive two interiorly-threaded nuts 3 and $3^a$. One of said nuts, 3, is placed above and the other, $3^a$, below a horizontal plate 4, that has one end firmly attached to the upright part $1^b$ of the base and has the opposite end firmly supported from the base by a rest 5. A hole $4^a$ through said plate provides for the passage of the vertical spindle through it. The upper nut 3 serves as a lock-nut, while the lower nut $3^a$ serves to give to the spindle 2 a fine vertical adjustment. By loosening the lock-nut 3 the spindle is free to move up and down by turning the adjusting-nut $3^a$. When the required vertical adjustment of the spindle shall have been made, the adjustment is secured against accidental displacement by turning the lock-nut 3 down firmly against the upper side of the horizontal plate 4. The principal adjustment being made as hereinafter described, the adjustment just described is used only for the finer and more delicate adjustments of which the other is not capable. While the spindle 2 is vertically adjustable, it is made secure against any turning movement. To prevent the spindle from turning, a key 6 fits snugly into a keyway $2^b$, made in one side of the spindle, and a corresponding key-seat $1^c$ in the base. The upright part $1^b$ of the base is provided with a vertical slot extending downwardly from its upper end to allow the horizontal scriber herein described to be moved downwardly to a low adjustment. The bottom $1^e$ and the back face $1^f$ of the base are planes at right angles to each other.

To provide for guiding the gage along the edge of a table of a machine, a guide-bolt 7, having a round head $7^a$, passes through the foot of the base near its outer end and is secured in place by a thumb-nut 8. The head of the bolt engages the edge of the table of the machine with which the gage may be used. When it is desired to set the gage upon surfaces away from the edge of the machine-table or at places where the guide-bolt would interfere with the guide's setting level, said bolt may be removed.

The scribing-block 9 has a hole $9^a$ vertically through it, through which passes the spindle 2. Extending inwardly from one end of the scribing-block is a horizontal bore $9^b$, that extends past and at right angles to the axis of the vertical bore $9^a$. Within said horizontal bore 9ᵇ is a cylindrical holding-piece 10, (shown in axial section in Fig. 3,) having a hole 10ᵃ through it that is of a size to fit the spindle 2 and that registers with the vertical bore 9ᵃ through the scribing-block. One end of the cylindrical holder 10 is closed by a head 10ᵇ, made integral therewith and having an opening 10ᶜ through it, through which passes a lock-bolt 11. Said bolt is provided with a head 11ᵃ at its inner end, that fits the interior of the cylindrical holding-piece 10 and leaves a free passage through the hole 10ᵃ. The outer end 11ᵇ is threaded to receive the knurled nut 12. Through the lock-bolt 11 is a bore 11ᶜ. Upon the lock-bolt 11, between the nut 12 and the end of the scribing-block, are two washers 13 and 14, whose meeting faces have corresponding grooves 13ᵃ and 14ᵃ. The radially-adjustable scribe 15 passes through the hole 11ᶜ in the lock-bolt 11 and fits within the grooves of said washers. When the cylindrical holding-piece 10 is in its place within the scribing-block and the spindle 2 is through the vertical hole 9ᵃ in the scribing-block and the corresponding hole 10ᵃ through the holding-piece, the holding-piece is kept firmly in place and cannot be removed from said block. When the parts are so assembled, the turning of the knurled nut 12 serves to lock the scribing-block at its vertical adjustment on the spindle 2 by forcing the locking-cylinder and the scribing-blocks in opposite directions against the spindle and also locks the scribe 15 at its radial adjustment by clamping it tightly between the washers 13 and 14. The scribe 15 is of the well-known construction, consisting of a steel rod pointed at both ends and having one end straight and the other curved. The straight end is used to mark side work and the curved end to mark underneath and over work. The principal vertical adjustment of the scribing-block, with its scribes, is made by moving the said block up and down the spindle 2 and securing the adjustment by turning the set-nut 12. As it is very difficult to make a fine adjustment by moving the scribing-block, the vertical adjustment of the scribes is approximately fixed by adjusting the said block upon the spindle, and then a fine vertical adjustment of the scribes is secured by adjusting the spindle, as hereinbefore described.

The opposite end of the scribing-block carries a scribe 16, that is always held firmly in a horizontal position and has only horizontally-longitudinal adjustment. An exteriorly-threaded hollow pin 17 is carried in the transverse opening 9ᶜ. Within a slot 9ᵈ in the same end of the scribing-block is a knurled nut 18, that turns upon the pin 17 and gives to it a limited longitudinal movement. This provides for a fine horizontal adjustment of the horizontal scribe, its principal adjustment being made by moving the scribe in the hollow pin 17.

To secure the horizontal adjustment of the horizontal scribe 16 in the hollow pin 17, a vertical hole 17ᶜ is made through the head 17ᵇ of said pin, in which fits the locking device that holds the horizontal scribe firmly. This locking device consists of a lock-pin 19, having a hole 19ᵃ transversely through its lower end that is fitted within the bore 17ᶜ of the pin 17 and having its upper end threaded to receive the nut 20. The scribe 16 passes through the hole 19ᵃ and through the hollow pin 17. By turning the nut 20 the pin 19 is lifted and the scribe 16 is drawn against the upper side of the longitudinal opening through the pin 17, and thus firmly held in place. The principal adjustment is made by adjusting the scribe 16 in the pin 17, while a fine adjustment of said scribe is made by turning the nut 18, as hereinbefore described.

In using the horizontal scribe it is necessary to have the scribing-block exactly parallel with the face of the upright part of the base in laying out certain classes of work. To secure a perfect adjustment of the scribing-block with the base, the spindle 2 has a mark 2ᶜ, that runs in a straight line from end to end of the spindle, said line being in a plane that is exactly parallel with the plane upright face of the base. A mark 9ᵉ is also made upon the upper side of the scribing-block, the line upon the scribing-block being so placed that when brought to the line 2ᶜ on the spindle the scribing-block will be parallel with the base.

Having described the adjustment of the several parts of my gage in connection with the detailed description of the parts, no further description of the operation of my improvement is required. Persons skilled in the art will readily apply my improved gage in setting out work of all kinds, and because of the numerous accurate and secure adjustments they will be able to carry its use beyond that of any other surface-gage in laying out horizontal work, overwork, and underwork with a degree of accuracy and facility not heretofore accomplished.

What I claim as my invention is—

1. In a surface-gage, in combination with a vertically-adjustable scribing-block; a hollow pin threaded exteriorly and having a hole through it vertically at right angles to its longitudinal bore; a nut upon the hollow pin, said nut being carried by the scribing-block and adapted to give to the hollow pin a longitudinal movement by turning the nut; a lock-pin fitted in the vertical hole in the exteriorly-threaded pin, said lock-pin having a transverse hole that registers with the longitudinal bore of the exteriorly-threaded pin, a nut screwed upon the lock-pin, and a scribe projecting through the exteriorly-threaded pin and the lock-pin, substantially as described.

2. In a surface-gage, a vertical spindle; a scribing-block having a bore through which the vertical spindle passes, and being provided with an opening which intersects from one end the said bore; a holding-piece within said opening, the holding-piece having a transverse bore that registers with the bore through the scribing-block; a pin carried by the holding-piece, said pin having its outer end threaded and being provided with a transverse bore; and a nut screwed upon the threaded end of the last-named pin to clamp the scribing-block to the vertical spindle to fix its adjustment thereon, substantially as described.

In testimony whereof I affix my signature in the presence of two witnesses.

ANASTAZY SADOWSKI.

Witnesses:
   THOS. MATIA,
   J. A. OSBORNE.